Dec. 14, 1965  H. SHAPIRO  3,223,867
AXIAL AIR GAP MOTOR
Filed Oct. 9, 1961  5 Sheets-Sheet 1

FIG. I

INVENTOR.
HARRIS SHAPIRO
BY
his ATTORNEYS

Dec. 14, 1965                H. SHAPIRO                3,223,867
                           AXIAL AIR GAP MOTOR
Filed Oct. 9, 1961                              5 Sheets-Sheet 4
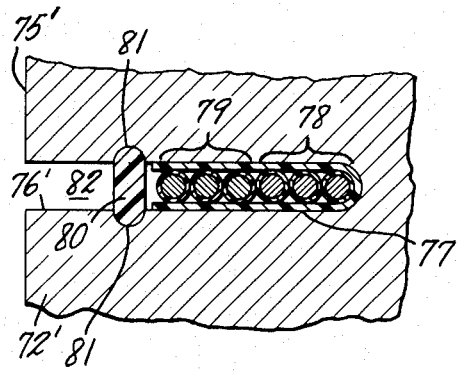
FIG. 5
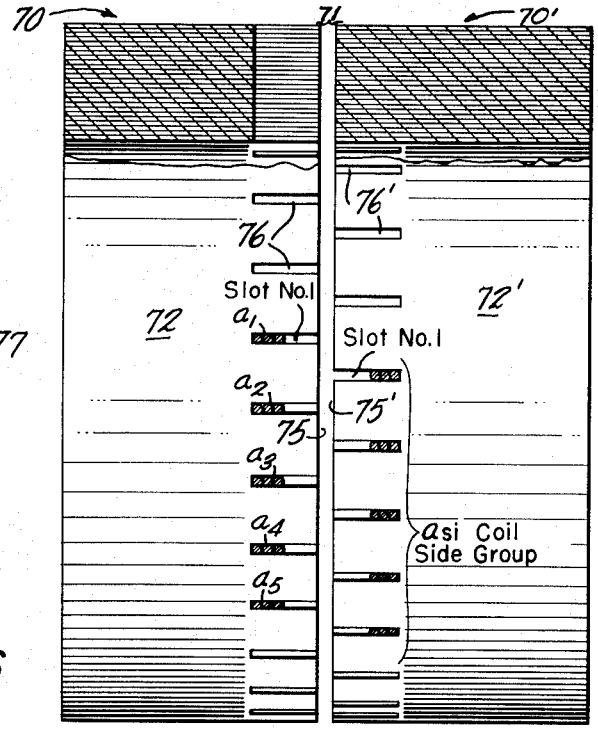
FIG. 6
FIG. 8
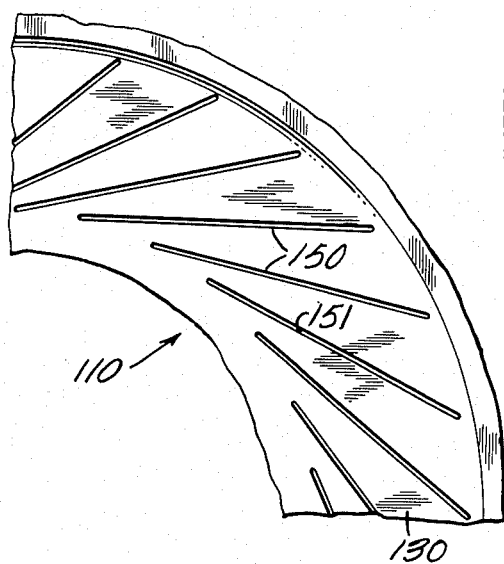
FIG. 9
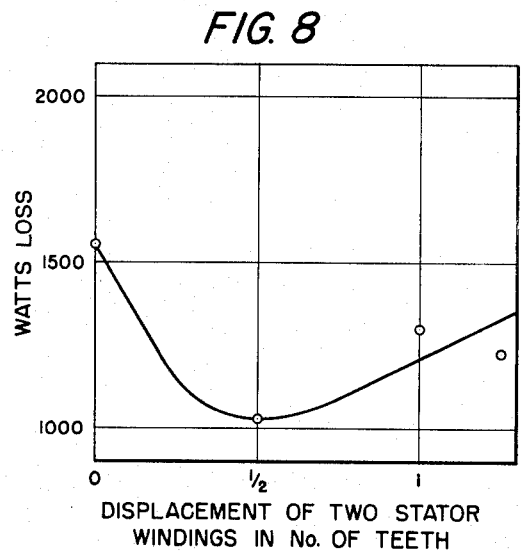
INVENTOR.
HARRIS SHAPIRO
his ATTORNEYS

INVENTOR.
HARRIS SHAPIRO

United States Patent Office 3,223,867
Patented Dec. 14, 1965

3,223,867
AXIAL AIR GAP MOTOR
Harris Shapiro, Oradell, N.J., assignor to General Dynamics Corporation, New York, N.Y., a corporation of Delaware
Filed Oct. 9, 1961, Ser. No. 143,614
4 Claims. (Cl. 310—166)

This invention relates to single and double axial air gap motors and to certain electrical improvements in such a motor.

It has been proposed in U.S. Patent 2,550,571 to Litman that a double axial air gap motor could be constructed to operate in accordance with the principle of operation of a conventional squirrel cage motor. Litman has proposed that the single, hollow cylindrical, axially sloted, field-supplying stator of the ordinary squirrel cage motor may be replaced by a pair of annular, radially-slotted polyphase-wound stators disposed concentric with the axis of the motor shaft and spaced from each other along such axis to be separated by an axial, interstator gap of annular cross section in a radial plane. In the proposed double axial air gap motor, the drum shaped, axially-slotted rotor of the usual squirrel cage motor would be replaced by a disc shaped rotor with spoke-like magnetic teeth carried by the motor shaft and having an annular portion disposed in the interstator gap in axially spaced relation from each stator and separated from each stator by a rotor-stator air gap.

Litman proposes that the two polyphase-wound stators of the motor would develop respective magnetic fields which would rotate in the inter-stator gap in a common direction around the motor axis, and which would be oppositely phased to cause magnetic flux common to both stators to pass axially through the rotor and through both of the two rotor-stator groups. The two rotating fields would induce in the rotor a current which interacts with such fields to develop in the rotor a mechanical force which varies with the rotor slip, and which exerts on the rotor a torque producing rotation thereof. Single axial air gap motors with only one stator have also been proposed and there has been the suggestion for a "compound" single axial air gap motor in which there would be two wound stators producing two rotating magnetic fields but in which the flux of each field would traverse only one air gap. In both simple and compound, single air gap motors, the flux of the field produced by each of the one or two stators would traverse the same air gap twice by passing from the stator to the rotor, next radially through the rotor and then back to the stator.

In all of such proposed axial air gap motors, the rotors have been shown as being made from magnetic material with a planar squirrel cage inserted. For double air gap motors, the purpose has been to reduce the reluctance of the inter-stator path for the magnetic flux passing axially through that path, and, in single air gap motors, to provide a magnetic "short circuit" for the flux passing radially through the rotor. Litman has also suggested a rotor largely of magnetic material would be magnetically attracted in opposite directions towards the two stators and that the axial force on the rotor could thereby be balanced and thus eliminate the need for any thrust bearing on the motor shaft.

The magnetic attraction proposed by Litman has, however, the disadvantage that the balance of forces obtained would be dynamically unstable. Thus, if the rotor were to become axially shifted from its position at which the opposite magnetic attractions thereon are equal, then, because magnetic attraction is essentially in accordance with the inverse square law, the attraction of the rotor toward the stator brought nearer by the shift would increase out of proportion to the amount of shift. Conversely, the attraction of the rotor towards the other stator would be decreased out of proportion to the amount of shift. Hence, if the axial movement of the rotor were unconstrained, once the rotor shifts from its position of balance, the rotor would be drawn into contact with the nearer stator to rub against the face thereof.

Furthermore, even if the rotor were axially constrained by thrust bearings or the like, any play in the bearings or any axial deflection of the rotor in the interstator gap would result in the rotor rubbing against the nearer stator unless the rotor-stator air gaps were widened to such an extent that the increased reluctance thereby produced would cancel out the decrease in reluctance sought to be obtained by incorporating magnetic material in the rotor. Still further, the employment of magnetic material in the rotor has the disadvantages in the first instance that such magnetic material increases the mass of the rotor, the rotor leakage reactance thereof, and, also, the surface losses of the rotor.

It is accordingly an object of this invention to provide a double axial air gap motor which is free of the above-noted disadvantages.

Further objects of this invention are to minimize power losses in axial air gap motors, to improve the cooling thereof, and to eliminate the need in a double axial air gap motor of bearings in the motor itself for the shaft of the motor.

These and other objects are realized according to the invention by employing in a double axial air gap motor a rotor of simple and practical construction in which the portion thereof in the inter-stator gap is equally and oppositely repelled electrodynamically by the two stators rather than being equally and oppositely attracted magnetically thereby. As pointed out hereinafter, the balancing of the axial forces on the rotor by electrodynamic repulsion instead of by magnetic attraction is a technique which produces a dynamically stable balance of such forces.

Further, according to the invention, whether or not electrodynamic repulsion is used to produce an axial force balance of the rotor, power losses in an axial air gap motor are reduced by any one or more of the following: (a) constructing the rotor so that the rim portion thereof provides a relatively low resistance path for current; (b) constructing the rotor so that the hub portion thereof provides a relatively low resistance path for current; (c) slotting the rotor to control harmonics; and (d) in the case of a double air gap motor with two rotating fields, shifting the space phase of those fields from an exact opposed phase relation by an amount which reduces power losses due to harmonics, and which obtains other advantages hereinafter described.

As another aspect of the invention which is usable with but distinct from either of the two aspects just mentioned, improved cooling for an axial air gap motor (single or double) is obtained by providing fan blades on the inner or outer periphery of the rotor, and by employing such blades to produce a flow of cooling air past the rotor and past the stator or stators.

As still another distinctive aspect of the invention, elimination of bearings within an axial air gap motor (single or double) is attained by supporting a shaft common to the motor and to a load unit driven thereby with bearing means located in the load unit.

For a better understanding of the invention, reference is made to the following detailed description of an exemplary embodiment thereof, and to the accompanying drawings wherein:

FIG. 5 is an enlarged view (taken in a chordal cross section through one of the FIG. 1 stators) of the details of a stator slot and of the elements contained by such slot;

FIG. 6 is a schematic front elevation of the two stators of the FIG. 1 motor when such stators have been relatively rotated to shift the fields produced thereby from an exact opposed phase relation;

FIG. 8 is a graphical diagram of the reduction in power loss effected by a relative rotation of the stators such as is shown in FIG. 6; and FIG. 9 is a fragmentary view of a modification of the rotor of the FIG. 1 motor.

For convenience of illustration, the axis of the motor is shown in the above figures as being horizontal. In many application, however, such axis would be vertical.

Figure 1:
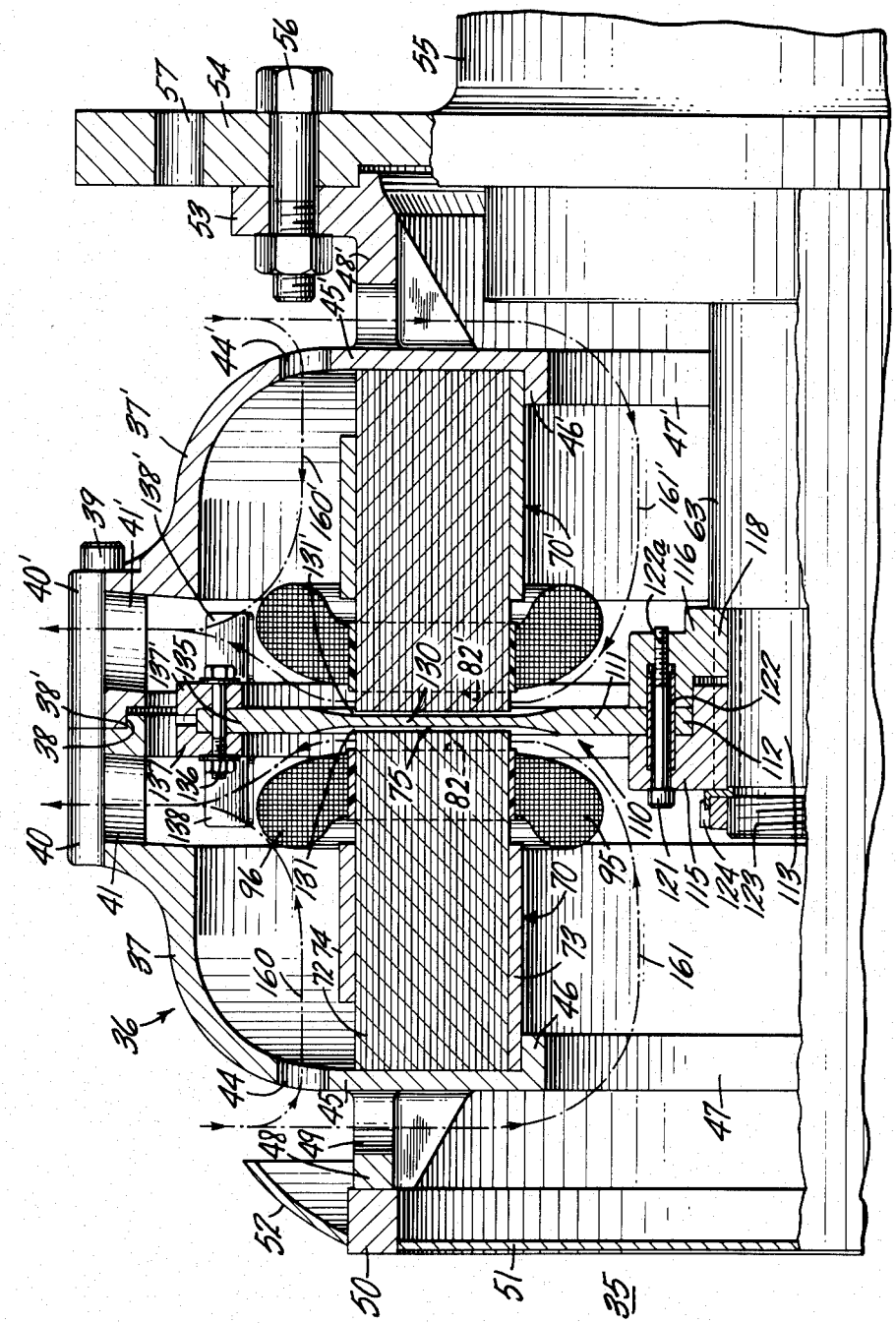
FIGURE 1 is a view of cross section of one-half of a double axial air gap motor whose construction is symmetrical about the axis of the shaft thereof.

In the description which follows, those elements of the FIG. 1 motor which are counterparts of each other are designated by the same reference numbers. Such counterpart elements are, however, distinguished from each other in designation by employing different suffixes (such as a prime ('), a special subscript designation or the like) in conjunction with their common reference numeral. Unless the context otherwise requires, the description hereinafter, of one of such counterpart elements is to be taken as also applying to all other elements having the same reference numeral.

Referring now to FIG. 1, the numeral 35 generally designates a double axial air gap motor having a housing 36. Such housing is comprised of left and right hand hollow, rounded casings 37, 37' of which an outwardly facing, circular shoulder 38 on the former mates with an inwardly facing circular shoulder 38' on the latter to provide a peripheral overlap of the casings in the axially central region of the motor. The two casings are fastened together by axial bolts 39 spaced equiangularly around the motor and passing through bolt holes (not shown) in casing 37' into registering threaded bolt holes (not shown) extending into casing 37. Around the bolt holes therein, the casing 37 is thickened for reinforcing purposes, such thickening producing a number of prominences 40 equiangularly spaced around the periphery of the casing. Intervening those prominences the casing 37 has formed therein a number of air outlet vents 41. As shown, the right hand casing 37' has similar prominences 40' (axially registering with prominences 40) and similar vents 41'.

From its axially central portion, the casing 37 curves inwardly to a portion thereof in which are formed a plurality of equiangularly spaced air inlet ports 44. Radially inwards of those ports, the casing is shaped to provide a radially flat wall 45 terminated at its inner margin by an in-turned annular lip 46 surrounding a circular opening 47 to the interior of the motor. Secured to the outside of wall 46 is a ring-shaped mounting member 48 radially perforated by a plurality of air inlet ports 49 spaced at angular intervals around the member. The left hand end of the motor is closed by a cover assembly comprised of: (a) a fastening ring 50 bolted (by bolts not shown) to the member 48; (b) a circular cover plate 51 joined around its periphery to the inside of ring 50, and (c) an annular cowling 52 disposed around and secured to such ring.

The description just given of casing 37 applies also to right hand casing 37' excepting that the ring member 48' of such right hand casing terminates at its right hand end in an out-turned flange 53. That flange permits a fastening of the FIG. 1 motor to the flange 54 of a load device 55 by axial bolts 56 passing through both flanges. As shown, the flange 54 extends radially outward of flange 53 and has formed therein a plurality of bolt holes 57 for securing the motor-load device assembly to some sort of support. Thus, on board ship the assembly may be fastened to the deck by bolts passed through those bolt holes, the axis of the motor and load device being vertical, and the load device being received in a suitable well formed in the deck.

Figure 2:
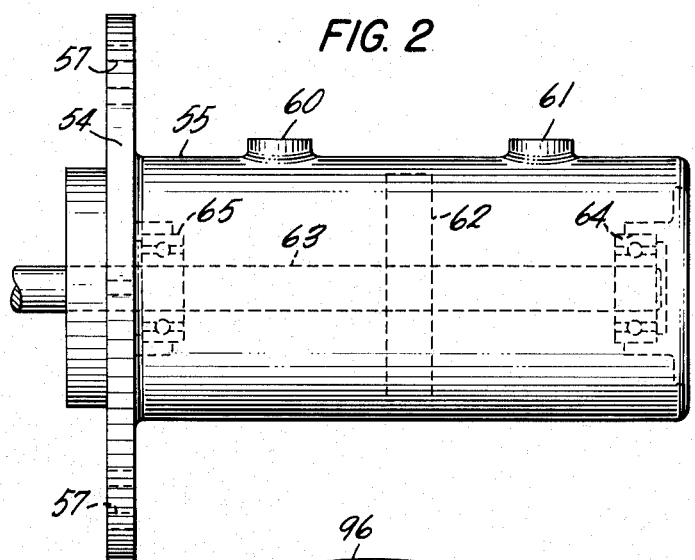
FIG. 2 is a schematic view in front elevation of a load device for the motor of FIG. 1.

Referring now to FIG. 2, while the load device 55 for motor 35 may be an electrical generator, a fan or any other device providing a rotary load, the device 55 is shown schematically herein as being a turbo-pump having a fluid inlet 60, a fluid outlet 61 and a rotary pumping element 62 driven by a shaft 63 which is common to the pump 55 and to the motor 35. Comparing FIGS. 1 and 2, it will be seen that a length of the shaft 63 projects from the pump into the motor to extend to the axially central region of the latter.

The shaft 63 is rotatably supported in pump 55 by two conventional bearing assemblies disposed at opposite axial ends of the pump. The length of shaft 63 in motor 35 does not have any support of its own but is supported entirely by the bearings 64, 65 within the pump.

The stator means of motor 35 is comprised (FIG. 1) of left-hand and right-hand annular stators 70, 70' coaxial with the shaft 63 and axially spaced from each other to be separated by an inter-stator gap 71 (FIG. 6). Since the two stators are similar in structure, only that of the left-hand stator 70 will be described in detail.

The core 72 of stator 70 is formed of steel tape which is spirally wound on a tubular mandrel 73, and which is surrounded by a restraining ring 74. Such core 72 is welded or otherwise secured to the wall 45 of left-hand motor casing 37.

As shown (FIG. 3), the stator core 72 is of annular form and has an annular, planar front face 75 which borders the left-hand side of the inter-stator gap 71. That face 75 has milled therein thirty radial slots generally designated by the reference numeral 76, the slots being spaced around the face at 12° intervals.

Referring to FIG. 5 (which shows the details of a slot for the right-hand stator core 72'), a folded-over sheet 77 of insulation (e.g., "Mylar") is inserted in the bottom of each slot. The pocket formed in such insert contains an inner group 78 of three wire turns forming an active side of a winding coil, and, also, an outer group 79 of three wire turns forming an active side of another winding coil. The two coil sides are locked into the slot by an insulating wedge 80 received in lateral notches 81 formed in the slot. As shown, such wedge is disposed inwardly of the mouth of the slot by an amount greater than the slot width. Accordingly, the front end of the slot forms in the annular front face of the stator core a recessed air passageway extending radially between the inner and outer cylindrical surfaces of the core and having a greater depth than width. The radial passageways so provided by the stator slots are useful for reasons later discussed.

Figure 4:
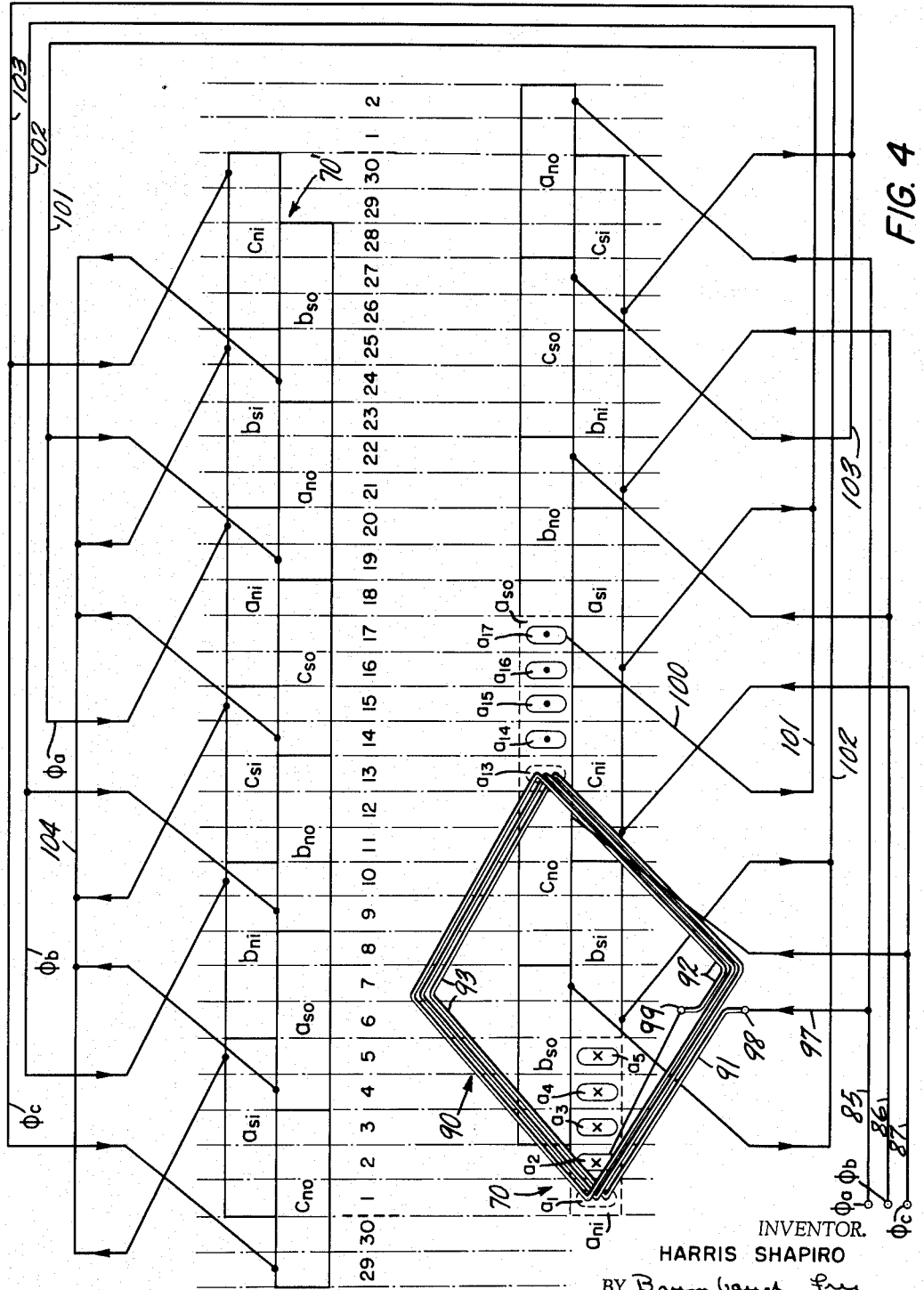
FIG. 4 is a developed schematic view of the mode of winding and electrical interconnection of the two stators of the FIG. 1 motor when the fields produced by those stators are in exact phase opposition.

FIG. 4 is a schematic developed view, looking radially inward, of the windings on stators 70, 70' and of the electrical interconnections of those windings. The thirty slots in stator 70 and the corresponding thirty slots in stator 70' (each slot in one stator being paired with one particular slot in the other) are respectively designated by the reference numerals 1–30 extending in a horizontal row across FIG. 4. Each slot contains an inwardly disposed active side of a winding coil and an outwardly disposed active side of another winding coil. Both stator windings are polyphase windings, the term "polyphase" being used herein in its usual sense in the electrical art (and in constradistinction to mere "multiple phase") as referring to a plurality of phases of which each has, ideally, equal phase displacement from the next-preceding and the next-succeeding phase, the amount of such phase displacement being the same for all phases.

The thirty inwardly disposed active coil sides of stator 70 are fed by one or the other of phases $a$, $b$ and $c$ of a three phase current supply provided by cables 85, 86 and 87. Those last named coil sides are divided into six groups each comprised of five successive coil sides and designated from left to right in the figure as coil side groups $a_{ni}$, $b_{si}$, $c_{ni}$, $a_{si}$, $b_{ni}$, and $c_{si}$. The reference letter for each of those coil side groups indicates the phase by which the coil sides in that group are fed. Further, the subscript suffixes $n$ and $s$ designate that the instantaneous flow of current through the coil sides of the designated group is considered as being in the direction of, respectively, radially inward and radially outward through the slots in which the coil sides of the group are laid. The subscript suffix $i$ is used to indicate that the coil sides of the groups designated by $i$ are inwardly disposed within the slots in which such coil sides are received. In contrast, the suffix $o$ indicates that the coil sides to which it pertains are outwardly disposed within the slots in which such coil sides are received.

As an example of the use of the designations just discussed, the designation $a_{ni}$ indicates that the coil sides of the group so designated are inwardly disposed or "bottom" coil sides in the slot in which they are laid, that such coil sides are fed by phase $a$ current, and that such current is assumed to have a radially inward direction of flow through the slots by which such coil sides are contained.

From the explanation just given, the slot distribution of the inwardly and outwardly disposed coil sides of stator 70 should be apparent from FIG. 4. Likewise, the slot distributions of the inwardly and outwardly disposed coil side groups of stator 70' should be apparent from that figure.

The active coil sides in the slots of each stator are parts of coils of which there are thirty per stator, and of which an exemplary one is the coil 90 represented schematically in FIG. 4. Such coil is formed by the winding of a continuous insulated wire 91 into three bundled loops or turns of a shape to divide the coil into two separate straight line segments $a_1$ and $a_{13}$ and into two end extensions 92 and 93 disposed between those two segments at opposite radial ends of the coil. As shown, the segment $a_1$ of coil 90 is laid into slot 1 to be the inwardly disposed coil side therein, whereas the segment $a_{13}$ of coil 90 is laid into slot 13 to be the outwardly disposed coil side in that last named slot.

The two coil sides $a_1$ and $a_{13}$ are active coil sides of coil 90 in that both of those lengths are parts of coil 90 which are effective to produce useful magnetic flux. Inasmuch as the slots 1 and 13 in which coil 90 is laid are less than 180 electrical degrees apart, it is evident that the winding of stator 70 is a fractional pitch winding which serves in a well-known manner to suppress space harmonics in the distribution of flux caused by curent energizing the winding.

The coil sides $a_1$ and $a_{13}$ of coil 90 are the leftward most coil sides of, respectively, the coil side groups $a_{ni}$ and $a_{so}$. The remainder of the coil sides in those two groups are provided by like coils. Thus, the coil side $a_2$ of group $a_{ni}$ and the coil side $a_{14}$ of the group $a_{so}$ belong to a common coil next right to coil 90, and, similarly, the pairs of coil sides $a_3$, $a_{15}$; $a_4$, $a_{16}$; and $a_5$, $a_{17}$; respectively, belong to three more separate coils disposed rightwardly of coil 90. In the same manner, the five coil sides in group $b_{si}$ and the five coil sides in group $b_{no}$ are provided by five separate coils (not shown) furnishing only those particular lower and upper coil side groups, and the rest of the coil side groups are analogously provided.

Figure 3:
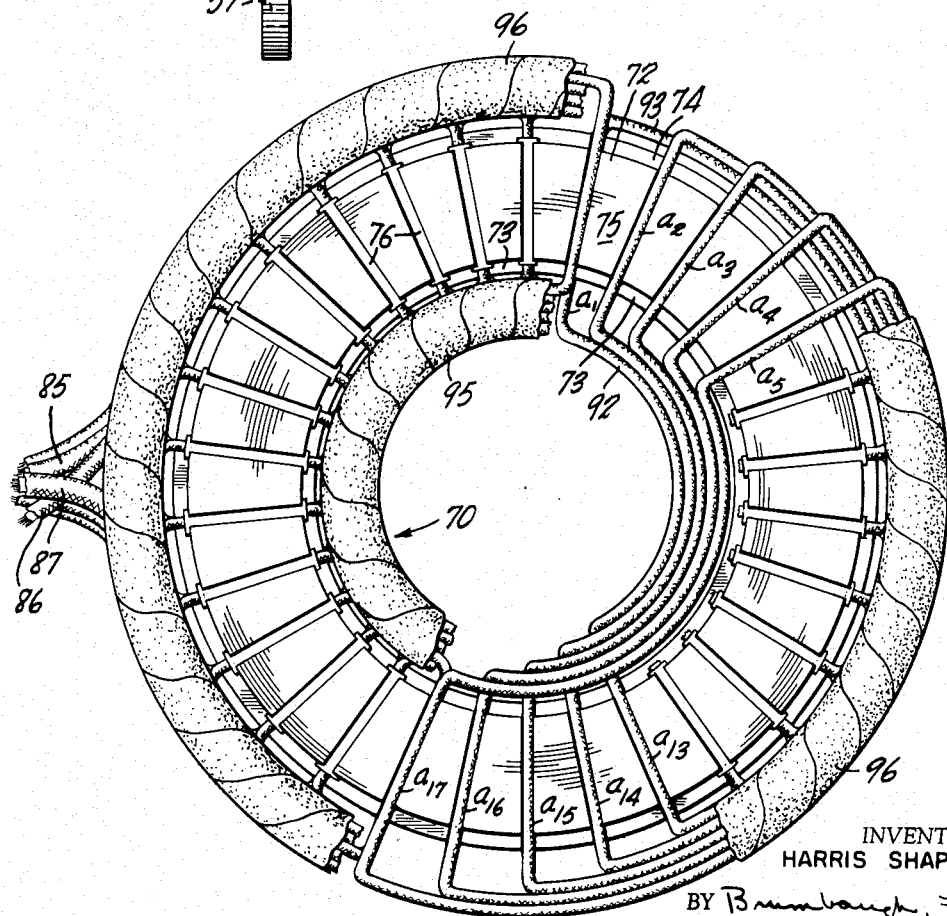
FIG. 3 is an end elevation of the front face of one of the wound stators of the motors of FIG. 1.

FIG. 3 illustrates the individual structure and mutual arrangement in a structural sense of the thirty coils on stator 70. As shown by that last named figure, the radially inner end extensions of the several coils are bound together to form an inner annular band 95. Similarly, the radially outer end extensions of such coils are bound into an outer annular band 96.

The windings of the stator 70 and 70' (FIG. 4) are electrically connected with the three phase supply and with each other as follows. The phase $a$ current from cable 85 is fed by a lead 97 to the input terminal 98 of the coil 90 of which the output terminal 99 is connected to the input terminal of the adjacent rightward coil (not shown) whose active sides are $a_2$ and $a_{14}$. Within coil 90 the current circulates in succession through the three turns of wire 91, such current being considered to flow radially inward and outward through, respectively, slots 1 and 13 as indicated by the symbols $(x)$ and $(.)$ appearing on FIG. 4 in conjunction with, respectively, the coil side groups $a_{ni}$ and $a_{so}$. Having so circulated in coil 90, the phase $a$ current passes by terminal 99 to the next rightward coil to circulate therein, thence on to the successive rightward coil, and so forth, until such current has circulated in all five of the lap-wound connected coils in the group $a_{ni}$, $a_{so}$. Thereupon the current passes by a lead 100 to a cable 101 supplying the phase $a$ current to the polyphase winding of stator 70'.

The five coils of stator 70 providing the coil sides $a_{si}$ and $a_{no}$ are likewise connected in lap-wound manner and, as shown, the series combination of those five coils is connected between cables 85 and 101 in parallel with the earlier discussed, phase $a$ coil group $a_{ni}$, $a_{so}$. If desired, however, the two phase $a$ coil groups of stator 70 may be connected in series with each other between those two cables.

By connections similar to that of the phase $a$ coil groups, the separate phase $b$ coil groups $b_{si}$, $b_{no}$ and $b_{ni}$, $b_{so}$ have current passed therethrough from cable 86 to a cable 102 supplying phase $b$ current to stator 70'. Likewise, the separate phase $c$ coil groups $c_{ni}$, $c_{so}$ and $c_{si}$, $c_{no}$ have current passed therethrough from cable 87 to a cable 103 supplying phase $c$ current to the last named stator.

The cables 101, 102, 103 are respectively connected to the coil groups of phase $a$, $b$ and $c$ of stator 70' to pass current therethrough in a manner which is generally analogous to that already described for the coil groups of stator 70, but which differs in the respect that all currents in the windings on stator 70' terminate at a common junction 104.

To summarize briefly the foregoing discussion of FIG. 4, each of stators 70 and 70' has thereon a polyphase, lap-wound, fractional-pitch, distributed winding adapted to generate a revolving magnetic field in the inner stator gap 71 between the two stators. The respective distributions of the coil groups in the two stator windings are such that the two fields which are respectively produced thereby are of the following character. First, both fields are two-pole fields, although, if desired, the stators may be wound to produce fields both having a greater, even, like number of poles as, say four or six poles. Second, the stators are so wound, that, looking in one direction along the axis of the motor shaft (e.g., in the direction toward pump 55), both fields have the same direction of rotation around that axis. Third, the two stators are so wound that when slot 1 of stator 70 has the disposition shown in FIG. 4 of being directly opposite slot 1 of stator 70', the fields of the two stators are exactly opposed in space phase relation. By this is meant that the intensity peak of fundamental north flux in the revolving field of stator 70 is directly opposite the intensity peak of fundamental south flux in the revolving fiield of stator 70', the two fields elsewhere having flux distributions such that a given intensity value of fundamental flux belonging to one field registers with an equal intensity value of opposite polarity fundamental flux belonging to the other field. The relative disposition of stators 70, 70' which yields that exact opposed phase relation between the two fields has been shown in FIG. 4 merely to facilitate the disclosure since, as pointed out hereafter, better results are obtained when some degree of angular misregistration exists between the two stators, and when, accordingly, the fields depart somewhat from being exactly opposed in phase.

Returning to FIG. 1, axially disposed between the stators 70 and 70' is a rotor disc 110 constituted of a metal which has siutably high mechanical strength and suitably low electrical resistivity. Thus, the disc 110 may be constituted of, say, hard drawn copper, chrome copper, aluminum, brass or titanium. A hub portion 111 of the rotor surrounds a central rotor aperture 112 through which passes the free end 113 (of reduced diameter) of the shaft 63. Such hub portion 111 has an axial dimension greater than that of interstator gap 71.

The shaft end 113 and the rotor disc 110 are fixedly secured with each other in a manner as follows. Two collars 115 and 116 are fitted on the shaft end to lie on opposite sides of the hub 111. Both collars are locked to rotate with shaft 63 by a key 117 (FIG. 7) inserted into a key way 118 formed by axial slots 119 cut into the collars and a registering axial slot 120 cut into the shaft end 113. The collars are drawn tight against the sides of hub 111 by equiangularly spaced axial bolts 121 passing through collar 115 and through holes 122 in the rotor hub 111 to be received in threaded holes 122a formed in the collar 116. The assembly of the rotor and the collars is then locked against axial movement on shaft end 113 by a nut 123 threaded onto the shaft end, and by a lock washer 124 which holds that nut in place. If desired, the collars 115, 116 may be made integral with the hub 111.

In lieu of connecting the rotor to the shaft in the manner just described, the shaft and rotor may be made integral by machining them from a signal metal piece (to thereby eliminate both the central aperture 112 in the rotor and the bolt holes 122 therein). As another alternative, the rotor hub 111 may be a hub having no central aperture 112, the hub being bolted to an end flange on the shaft. To so eliminate a central perforation in the rotor is advantageous because such a perforation substantially increases the maximum stress in the rotor material.

Outwardly of hub 111, the rotor 110 is tapered in axial cross section to diminish in thickness (with increasing radius) down to a thin annular web portion 130 disposed in inter-stator gap 71 midway between the stators 70 and 70' to be separated from the front faces 75 and 75' of the former and of the latter by, respectively, the small clearance rotor-stator gaps 131 and 131'. It is to be noted that, in the rotor shown in FIGS. 1 and 7, the web portion of the rotor is formed entirely of nonmagnetic material extending through 360° around the web portion.

Radially beyond the inter-stator gap 71, the web 130 of the rotor is joined by a taper (diverging radially outward) of the faces of the rotor to a rotor rim portion 135. Bolted to opposite sides of such rim portions by axial bolts 136 are a pair of cast aluminum rings 137, 137' which are respective carriers of equiangularly spaced fan blades 138 and a similar set of fan blades 138'. In the disclosed embodiment, those fan blades are radially aligned, (FIG. 7) so as to be effective to draw air for either direction of rotation of the rotor. Such blades may, however, be tilted for the purpose of increasing their air drawing capacity for one selected direction of rotor rotation. Further, such fan blades may be made integral parts of the rotor. Still further, the fan blades may be carried by the hub of the rotor instead of by the rim thereof.

The web 130 of rotor disk 110 has currents induced therein by the revolving magnetic fields generated by the stators 70 and 70'. Those currents in turn interact with the fields which induce them to produce rotation of rotor 110 in a manner analogous to that by which the current in an ordinary squirrel cage rotor produces rotation thereof. That is, for any slip between the speed of the rotor and the synchronous speed at which the magnetic fields revolve (3600 r.p.m. for two-pole fields and 60 cycle exciting current), the currents in rotor 110 exert on the rotor a driving torque which increases with slip over a range thereof starting at zero slip.

In connection with the driving of the rotor by the fields, it is of interest to note that, because the two fields are in opposed space phase relation, the two stator cores 72 and 72' are separate parts of a single magnetic circuit. To wit, considering flux which flows into interstator gap 71 from the top of the front face 75 of core 72, such flux follows a path as follows: rightward from the top of front face 75 through rotor-stator gap 131, the rotor web 130 and the rotor-stator gap 131' into the top of stator core 72'; downward in that annular core 72' on either side of the central aperture therein to the bottom of core 72'; from such bottom leftward through rotor-stator gap 131', rotor web 130 and rotor-stator gap 131 into the bottom of core 72; and upward in that annular core 72 on either side of the central aperture therein back to the point of beginning at the top of the core. Thus, such flux traverses both of the two stator cores and both of the two rotor-stator gaps 131, 131'. Note that, when the stator windings are in an exact or (as later described) an approximate magnetic alignment axially, since they are connected in series aiding, they are in, what might be termed, a push-pull magnetic relation so as to aid each other in creating such flux.

As is well known, a current induced in a conductor by a magnetic field repels such conductor from the source of the field by a force which, to an approximation, is inversely proportional to the square of the distance between the conductor and the source. On the other hand, a piece of magnetic material is attracted to a source of magnetic field by a force which, to an approximation, likewise varies inversely with the square of the distance between the source and the piece. In the disclosed motor, the stator cores 72, 72' are magnetic field sources, and the rotor web 130 is a conductor in which current is induced by the two fields from those two sources. Since the disclosed web 130 contains no magnetic material, it is not attracted to either stator core. The current induced in the rotor web does, however, produce a repulsion thereof from core 72 and, by symmetry considerations, a similar repulsion of the web from core 72'. Hence, the web 130 is acted upon by two oppositely directed repulsion forces. When the rotor web is midway between the stator cores 72, 72', the opposite repulsion forces thereon are of equal value, and, accordingly, the rotor 110 is balanced in respect to the axial electrodynamic forces to which it is subjected.

Assume now that, for some reason, the rotor web 130 undergoes a slight shift from its position of exact balance toward the stator core 72. Because the electrodynamic repulsive force between web 130 and core 72 is governed by the inverse square law, the value of the ratio of the post-shift strength to pre-shift strength of that force increases as a function of the amount of shift more rapidly than the value of the ratio of the pre-shift distance between elements 130 and 72 to the post-shift distance therebetween. Likewise, the value of the ratio of the post-shift to pre-shift strength of the repulsive force between web 130 and core 72' decreases more rapidly with shift of the web toward core 72 than the ratio of the pre-shift to post-shift distance between the web and core 72'. Hence, considering the net electrodynamic force exerted on rotor web 130 as a function of the amount of shift thereof from its reference position of exact balance (i.e., where the net magnetic force is zero), for a shift of the web in either direction from such reference position the net electrodynamic force thereon is always in a direction to urge the web back to reference position, and, furthermore, is of a magnitude which increases faster than linearly as the amount of shift increases. It follows that the oppositely directed repulsions exerted by stators 70 and 70' on rotor 110 tend to produce both a dynamically stable positioning of that rotor at the point where those two forces are equal in value and a dynamically stable balance of the forces acting thereon.

The rotor stability so attained gives rise to a number of advantages of which some are as follows. Considering the web 130 of the rotor as a deflectable member, the net repulsive force acting on such web tends to oppose any deflection thereof rather than augmenting such deflection as such force would if it were of attractive character. Also, such net repulsive force tends to damp out flutter in the rotating web rather than aiding such flutter as an attractive force would do. This being so, the mechanical strength of the web need not be relied upon to resist deflection and flutter, wherefore the web may be much thinner than if it were subjected to attractive forces. In fact, the web may be made so thin that it is less than about three-quarters (see FIG. 1) or even less than half the thickness of the inter-stator gap 71; e.g., 0.125 inch thick as compared to a thickness of 0.281 inch for the gap.

Electrically speaking, the reduction in web thickness may be expected to decrease the high frequency rotor harmonic losses. Further, such reduction of web thickness permits the width of the inter-stator gap to be correspondingly reduced. Still further, since the effect of the repulsive forces on the web is to minimize any lateral deflection thereof, the clearance required between the rotor and the stators is reduced to thereby permit a reduction in the amount by which the rotor must be separated from the stators by the rotor-stator gaps 131, 131'. Thus, the employment of oppositely acting repulsive forces to obtain a stable force balance on the rotor permits the reduction in two different ways of the size of the inter-stator gap and a corresponding reduction in the leakage reactance losses of the motor.

Another benefit arising from the reduction in thickness of the web (and elimination of magnetic material from the web) is a reduction in the rotor mass and an accompanying reduction of the tendency of an eccentricity in the center of mass of the rotating rotor to set up vibrations in the shaft 63. Any such reduction in vibration in turn implements the use, as described, of a shaft which is common both to the motor and to the load device driven thereby, but which is supported only within the load device.

Because as stated, the oppositely directed repulsive forces on the rotor produce a dynamically stable balance of the axial forces thereon and on the shaft 63 to which the rotor is secured, there is no thrust on the shaft which is required to be absorbed by a special thrust bearing as, say, a double row, angular contact bearing. Instead, the bearing support for the shaft may, as described, be provided entirely by conventional bearings disposed within the load device as standard equipment for that device. Inasmuch as bearings are a prime source of mechanical noise, the reduction in the number of bearings for shaft 63 from the usually required four bearings (two in the motor and two in the load device) down to two bearings is a feature which diminishes the noise output of the motor-load assembly, an important consideration in military and other applications. Also, by so eliminating the motor bearings, machining problems involved in aligning the respective axes of the motor and load device are much simplified, and the assembly of the motor is simplified.

The elimination of magnetic material from the rotor web 130 serves to reduce rotor leakage reactance and surface losses in the rotor. It is to be understood, however, that the realization of a dynamically stable balance of magnetic forces on the rotor does not necessarily require that all magnetic material be eliminated from the rotor portion in the interstator gap so that the only forces acting thereon are repulsive. More specifically the said portion of the rotor may be partly constituted of magnetic material and still obtain the described dynamically stable balance of forces so long as the repulsive forces which act on the rotor are greater than the magnetic attractive forces which act thereon. Thus, for example, in certain applications it may be desirable for the electroconductive non-magnetic web means to have a thin cladding of magnetic material or to be divided into separate axial thicknesses by one or more thin sheets of magnetic material.

Figure 7:
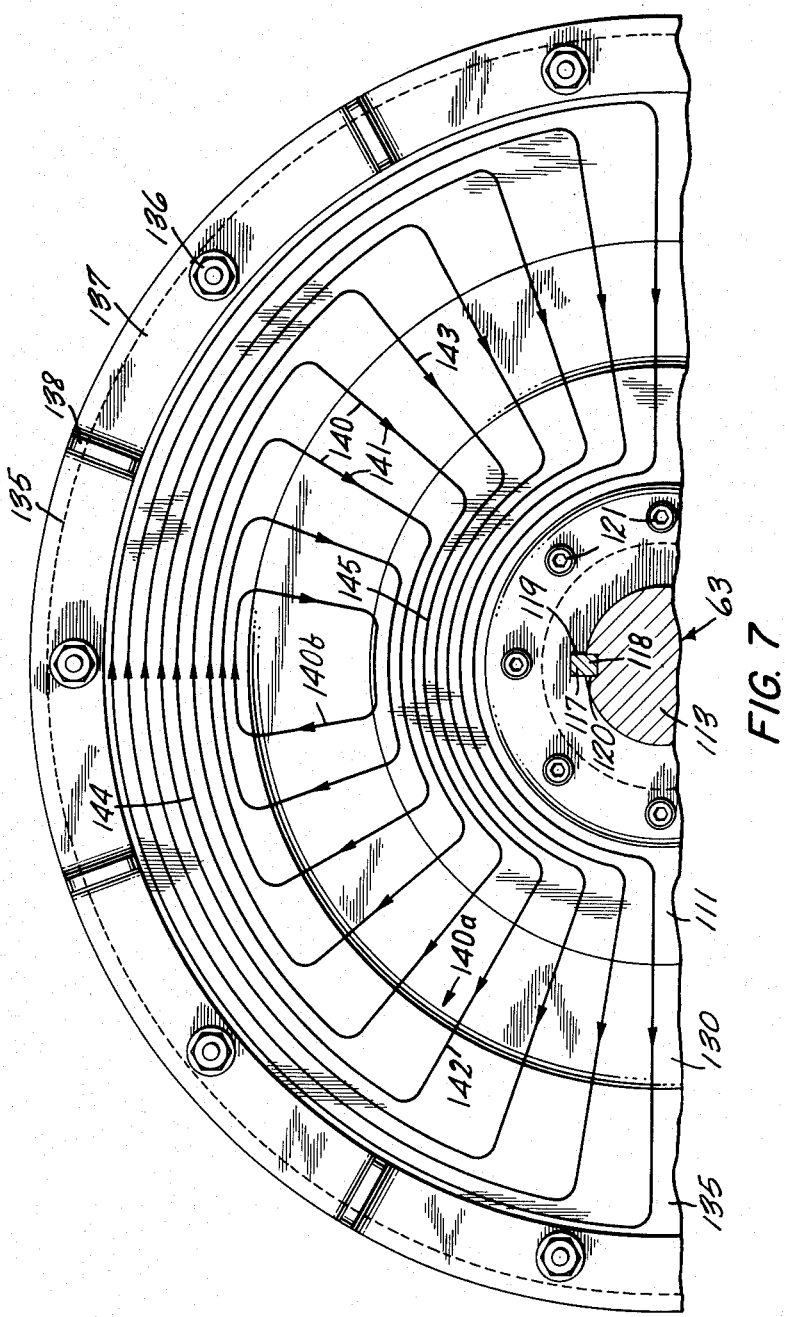
FIG. 7 is a detailed fragmentary view of one half of the rotor of the motor of FIG. 1.

The fact that the rotor web of FIGS. 1 and 7 is imperforate and in the form of a unitary continuous sheet of homogeneous material adds to the strength in hoop tension of the web. From the electrical point of view, a web of such character is desirable since it provides the greatest cross section of low resistivity material to radial currents flowing in the rotor and, accordingly, the lowest resistance to such currents and the lowest copper loss resulting from flow of a given amperage of such currents.

The distribution of the currents of slip frequency induced in rotor 110 is shown in FIG. 7 by the lines 140 indicating the loop paths for those currents and by the arrows 141 indicating the direction of current flow in such loop paths. Considering a typical loop path 140a, the current therein flows radially in loop sections 142, 143 traversing rotor web 130, and circumferentially in the loop sections 144 and 145 lying in, respectively, the rim 135 and the hub 111 of the rotor. The active portions of loop 140a are those lying in web 130 in that those are the portions in which the current flowing through the loop is induced in the rotor, and in which such radially-flowing current does useful work by interacting with the magnetic fields to develop a force which is normal to the radial direction, and which, accordingly, creates a driving torque in the rotor. In contrast, the portions of loop 140a provided by the rim and hub are passive portions in that in them the loop current is not exposed to the main magnetic fields, and hence generates no torque but produces heat. Similarly, in all the other loop paths which pass through the hub and rim as well as through the web, the current in each path does useful work in the web but is wasted in the rim and hub.

The rim and hub are nonetheless useful portions of the rotor in that they close the radially extending lengths of the loop paths over which the rotor currents do useful work. Specifically, if such hub and rim portions were not present, all of the loop current paths would be completed within the web. In this case, however, the radially extending portions of the loop in which the current creates effective rotor driving torque would be shorter than the corresponding radially extending portions of the loop paths passing through the hub and rim. Those radially extending portions of the loop would be the only ones in which useful work would be done since, although the portions of the loop path in which the current flows circumferentially are portions in the rotor web and, hence, are exposed to the revolving magnetic fields, the direction of the flow of the current in those circumferential portions would not be properly oriented in relation to the fields to create rotor driving torque.

Since much of the total length of the shown loop paths lies in the rotor rim and hub so that much of the power loss in the rotor occurs in those portions, and since, as stated, the rotor current while flowing in those hub and rim portions does no useful work but creates heat, it is desirable to reduce the resistance offered by the rim and hub to the rotor current and thereby reduce power losses in the rotor.

The lowering of the resistance of the path for circumferential current flow in the outer periphery of the rotor is accomplished by enlarging the radius of the rotor to provide therefor a rim portion disposed radially outwards of the inter-stator gap 71. Beyond this, however, the resistance of such path is further lowered by axially thickening such rim portion to have an axial dimension greater than that of the gap 71. In addition to reducing rotor power losses, the so-provided rim portion serves as a good mounting for the fan blades. Thus a rotor rim of the sort described is advantageous mechanically as well as electrically. The intimate contact between the outer rim and the fan blades improves the transfer of rotor heat to the air.

Much of the power losses in the rotor which are manifested as heat occur in the rim portion thereof. When such rim portion is disposed radially outward of the interstator gap 71, the heat radiated from the rim portion is not radiated towards the stator slots to heat the stator winding coils of which the insulation is adversely affected when exposed to too high a temperature. Hence, from a thermal point of view, a rotor rim disposed radially outwards of the inter-stator gap permits the heating of the rotor to a higher temperature without damaging the stator coil insulation then would otherwise be possible and, consequently, such rim portion permits the induction in the rotor of stronger currents and the obtaining from the rotor of more power than would otherwise be feasible.

At the inner periphery of the rotor, the resistance of the path for circumferential current flow is lowered in the described motor by axial thickening of rotor hub 111. Such hub thickening is particularly useful in that the electroconductive cross section provided by the rotor for conducting radial current is a cross section which diminishes radially inwards, and, hence, the resistance of the rotor to such current would increase radially inwards unless the hub thereof were thickened. Mechanically speaking, the thickened hub portion is advantageous because it stiffens the rotor web 130 against lateral deflection.

Referring now to FIG. 6, because the front faces 75, 75' of the stator cores 72, 72' are broken up into slots and intervening teeth rather than being continuous, the fields produced by the cores have harmonics introduced therein by the slot discontinuities. Such harmonics are undesirable in that they are the cause of a substantial power loss in the rotor. It has been found, however, that such harmonics can be considerably reduced by changing the relative angular position of the two stators from that shown in FIG. 4 wherein the slots of the same number in the two stators are directly opposite each other to the position shown in FIG. 6 wherein the same numbered slots of the two stators are in angular misregistration and, accordingly, the fields produced by the two stators depart somewhat from an exact out of phase relation.

In FIG. 6, the angular misregistration between the two stators is ½ slot pitch. That is, slot number 1 of stator 70' is angularly displaced from slot number 1 of stator 70 by half of the angular width between centers of any two adjacent slots. As shown by FIG. 8 a misregistration of ½ slot pitch reduces the power loss from harmonics by about 50%. It might be assumed that such a decrease in harmonic loss is caused by the geometric consideration that, irrespective of how the stators are wound, for ½ slot pitch displacement of the two arrays of slots on the stators, those arrays have their greatest possible angular misregistration. This is not the only explanation, however, since for a shifting of one slot pitch in the angular position of the two stators, their respective slot arrays are in alignment (i.e., slot number 1 of stator 70' is directly opposite another slot, namely, slot number 2 of stator 70), and yet (FIG. 8) a substantial reduction in harmonic loss is still obtained. Therefore, such harmonic loss reduction is partly (or perhaps wholly) attributable to the departure from exact opposed phase relation of the respective magnetic fields produced by the two stators. While FIG. 8 shows that the amount of such departure has a substantial range over which the harmonic loss is diminished, the range is less than the angular interval occupied by one coil side group since, for a departure greater than that interval, there would be no angular overlap at all between, say, the coil side group $a_{n1}$ on stator 70 and its complementary coil side group $a_{s1}$ on stator 70'.

Considering the effect of the described shifting of the stator fields on the percentage of the power input which is lost in the motor due to field harmonics, if the field of stators 70 and 70' were to be in exact opposed relation as shown in FIG. 4., in order to maintain such power loss at an acceptable percentage value of power input, it would be necessary to increase the number of stator slots and coil sides from thirty to, say, sixty so as to reduce the field harmonics by the method (alternative to shifting the field) of smooothing the harmonics out as a result of the more uniform distribution of the slots and coil sides. The practical design consequences of such doubling of the number of slots are a decrease in the value of the ratio of the width of each stator tooth to the width of each slot and, accordingly, a decrease in the value of the ratio of the total tooth area to total slot area presented by the front face of each stator core to the inter-stator gap. When, however, the ratio of total tooth area to total slot area is so decreased, the power input to the motor must likewise be decreased in order to maintain the tooth density of the magnetic flux generated in each stator at a density value which does not exceed the desired degree of saturation. Thus, reducing the power loss from field harmonics by increasing the number of slots and coil sides has the disadvantage that the power input to the motor must be decreased in measure with the increase in the number of slots.

The disadvantage just mentioned does not accompany the reduction in field harmonics by the method taught herein of shifting the phase of the two stator fields somewhat away from an exact opposed relation. In other words, the lesser number of slots required when the fields are so shifted increases the total tooth area of each stator face to thereby increase the amount of magnetic flux which can be generated in each stator without resulting in a flux density in the stator teeth which exceeds the proper degree of saturation. It follows that, given a certain percentage of input power to which the field harmonic power loss must be limited, the described shifting of the stator field permits the motor to operate at a much higher power input (so as to provide a greater power output) than if it were necessary to obtain such percentage figure by increasing the number of slots. Thus, for example, by being able to use a slot pitch to slot width ratio of, say, 4:1 by virtue of shifting the stator fields, the described motor is capable of producing a power output considerably greater than a like motor of the same size in which the fields are unshifted, and in which, as a result, it would be necessary to use a slot pitch to slot width ratio of, say, 2:1 to reduce the field harmonic power loss.

Moreover, when the stator fields are shifted, the lesser number of stator slots then required result in a decreased percentage power capacity loss from end slot leakage reactance since it permits the end extensions of the stator winding coils to be shortened. Such shortening is also advantageous because it reduces copper losses in such end extensions and because it permits the inner annular band 95 (FIG. 3) of such end extensions on each stator to be conveniently fitted into the motor between the stator and the motor shaft.

FIG. 6 is also of interest in relation to the previous discussion of how the double repulsion effect on the rotor web permits the size of the interstator gap to be reduced. That is, as indicated by the dimensioning of FIG. 6, the size of the gap 71 between stator cores 72, 72' may be so reduced as a result of the double repulsion effect that such gap size is about 1/10 or less of the size of the inner radius of the stator cores.

Harmonic losses in the rotor may be further reduced by the modification shown in FIGURE 9 wherein the web portion 130 of the rotor 110 is perforated by a plurality of narrow slots 150 of which the radially inward ends are spaced at equal angular intervals around the entire web portion. As shown, each slot is skewed in that it extends radially outward from its inner end at an angle to the radius of the rotor passing through that end, the angle of skew for all slots being the same. For some applications, the slots need not be skewed, i.e., may be slots extending wholly radially. While the slots may be open, the use of unfilled slots tends to diminish somewhat the strength in hoop tension of the web portion. Preferably, therefore, such slots 150 are filled or molded by inserts 151 of epoxy resin or of other material having a high electrical resistivity relative to the web material, but having high mechanical strength internally and an adherence bond of high strength to each of the opposite sides of the slot filled by the insert. Another aid in counteracting loss of strength in hoop tension is to cut the slots only part way through the rotor (from either one side thereof or both sides thereof) so as to leave a bridge of material connecting the opposite sides of the slot.

Coming lastly to the action (as the rotor spins) of the fan blades 138, 138' (FIG. 1), the left hand blades 138 draw cooling air through the left hand side of the motor by way of a path 160 wherein the air passes through the inlet ports 44, over the exterior cylindrical surface of stator 70, and out of the motor through outlet vent 41. The same left hand blades 138 also draw cooling air through another path 161 wherein the air enters the motor through inlet ports 49, passes over the interior cylindrical surface of stator 70, and is then drawn outwardly through the radial passageways 82 in the stator slots (FIG. 5) to be vented from the motor through the same vents 41 as are employed for air path 160. The right hand fan blades 138' similarly cool the right hand side of the motor by drawing air through the paths 160', 161' which are right hand counter-parts of the already described paths 160, 161.

The radial air passageways 82 in the stator slots facilitate and improve the cooling of the motor in a number of respects as follows. First, the passageways allow a much greater volume of air to be drawn through path 161 than if such air had no way to reach the fan blades except through the small clearance space 131 between the stator 70 and the rotor 110. Second, the flow of air through the passageways provides cooling where it is needed most, i.e., in the vicinity of the stator coils of which the insulation is deteriorated by excessive temperature. In this respect the stator coils contrast with the rotor which is uninsulated, and which therefore, can be run very hot. Third, the passageways 82 space the insulated stator coils away from the hot rotor to thereby protect the insulation on those coils from the heat radiated by the web portion of the rotor.

A double axial air gap motor in accordance with the invention has been built and has operated successfully. In that motor (with two-pole fields), some of the dimensions (in inches) of the motor were: outer diameter of rotor—19.00; outer diameter rotor web portion—14.25; inner diameter web portion—9.00; thickness of web—0.125; clearance between web and stator faces—0.078; thickness of rotor rim—0.375; thickness of rotor hub—0.484; mean diameter stator core—11.625; slot pitch on mean diameter of stator core—1.22; width of stator slot openings into rotor stator gap—0.187; depth of radial air passageways in slots—0.265. Based on a rated load of 75 hp., the motor had (without a fan) the following operating characteristics at 440 v., 60 cycles: full load speed—3470 r.p.m.; maximum torque—300% of full load torque; starting torque—150% of full load torque; starting current—550% of full load current; full load current—108 amperes; full load power factor—82%; full load efficiency—83.7%.

The above described embodiment being exemplary only, it will be understood that addittions thereto, omissions therefrom and modifications thereof can be made without departing from the spirit of the invention, and that the invention comprehends embodiments differing in form and/or detail from that specifically disclosed. Thus, for example, many of the features hereinbefore described are applicable to single axial air gap motors (simple or compound) and to double axial air gap motors with one wound stator as well as to double axial air gap motors with two wound stators. Accordingly, the invention is not to be considered as limited save as is consonant with the recitals of the following claims.

I claim:

1. A double axial air gap polyphase induction motor comprising, a pair of stators separated by an axial radially-annular flux gap, each stator comprising a magnetic core having toward said gap an annular magnetic face characterized by a large plurality of salient pole teeth and by radial slots which intervene said teeth and are equiangularly spaced entirely around the face, a pair of fractional-pitch lap-wound polyphase windings of which each is on a respective one of said core faces and is comprised of a plurality of phase belts of adjacent coils of which all coils in each belt are for currents of one phase, each coil of each winding being received in non-adjacent ones of the slots of the corresponding face so as to form a loop around a plurality of pole teeth of that face, said two windings being responsive to current energization to produce respective magnetic fields rotating in magnetic push-pull relation in a common direction around said gap, and a rotor having an annular electroconductive portion which is at least predominantly non-magnetic and which is disposed in said gap, said annular rotor portion axially extending from side to side of said rotor, and said annular rotor portion being responsive to said fields to be rotated thereby and to be axially repelled from each of said stators.

2. A motor as in claim 1 in which said rotor is characterized radially inward of said annular portion by an electroconductive hub which is axially thicker than said portion, said hub and portion being both provided by a unitary piece of electroconductive non-magnetic metal.

3. A motor as in claim 1 further comprised of a pair of fan blade support rings mounted on opposite sides of said rotor in concentric rotatably fixed relation therewith, and a set of fan blades carried by each ring and adapted upon rotation of said rotor to produce a flow of air for cooling the responding side of said rotor and the stator windings on such side.

4. A double axial air gap polyphase induction motor comprising, a pair of stators separated by an axial radially-annular flux gap, each stator comprising a magnetic core having towards said gap an annular magnetic face characterized by a large plurality of salient pole teeth and by radial slots which are the same in number for each stator, and which intervene said teeth, and are equiangularly spaced entirely around the face, the slots of each stator having a ratio of slot pitch to slot width of at least 4.0, a pair of fractional-pitch lap-wound polyphase windings of which each is on a respective one of said core faces and is comprised of a plurality of phase belts of adjacent coils of which all coils in each belt are for currents of one phase, each coil of each winding being received in non-adjacent ones of the slots of the corresponding face so as to form a loop around a plurality of pole teeth of that face, said two windings being responsive to current energization to produce respective magnetic fields rotating in magnetic push-pull relation in a common direction around said gap, and said two stators and respectively associated polyphase windings being in angular misregistration in an amount which is more than a slot width and less than the angular width of a phase belt, and which reduces power losses produced by harmonics in said fields, and a rotor having an annular electroconductive portion which is at least predominantly non-magnetic and which is disposed in said gap, said annular rotor portion axially extending from side to side of said rotor, and said annular rotor portion being responsive to said fields to be rotated thereby and to be axially repelled from each of said stators.

(References on following page)

References Cited by the Examiner

UNITED STATES PATENTS

| | | | |
|---|---|---|---|
| 547,069 | 10/1895 | Gorges | 310—268 |
| 1,737,128 | 11/1929 | Ross | 310—166 |
| 1,897,184 | 2/1933 | Zopp | 310—268 |
| 2,045,734 | 6/1936 | Swendsen | 310—124 |
| 2,479,589 | 8/1949 | Parker | 310—268 |
| 2,550,571 | 4/1951 | Litman | 310—268 |
| 2,573,283 | 10/1951 | Seitz | 310—268 |
| 2,607,969 | 8/1952 | Evans et al. | 310—105 |
| 2,635,547 | 4/1953 | Cataldo | 310—268 X |
| 2,640,166 | 5/1953 | Zozulin et al. | 310—105 |
| 2,796,541 | 6/1957 | Bessiere | 310—268 |
| 2,806,158 | 9/1957 | Emery et al. | 310—268 |
| 2,897,387 | 7/1959 | Welter | 310—268 |
| 2,956,189 | 10/1960 | Buss et al. | 310—211 |
| 3,069,577 | 12/1962 | Lee | 310—268 X |
| 3,090,880 | 5/1963 | Raymond | 310—268 |

ORIS L. RADER, *Primary Examiner.*

MILTON O. HIRSHFIELD, DAVID X. SLINEY, *Examiners.*

D. F. DUGGAN, L. McBRIDE, *Assistant Examiners.*

UNITED STATES PATENT OFFICE
CERTIFICATE OF CORRECTION

Patent No. 3,223,867                                            December 14, 1965

Harris Shapiro

It is hereby certified that error appears in the above numbered patent requiring correction and that the said Letters Patent should read as corrected below.

Column 1, line 17, for "sloted" read -- slotted --; line 36, for "groups" read -- air gaps --; column 3, line 27, for "application" read -- applications --; column 7, line 4, after "the" insert -- two --; line 8, for "siutably" read -- suitably --; line 35, for "signal" read -- single --; column 7, line 56, before "faces" insert -- side --; column 12, line 10, for "smooothing" read -- smoothing --.

Signed and sealed this 29th day of November 1966.

(SEAL)
Attest:

ERNEST W. SWIDER                                       EDWARD J. BRENNER
Attesting Officer                                             Commissioner of Patents